(12) United States Patent
Morita et al.

(10) Patent No.: US 8,770,721 B2
(45) Date of Patent: Jul. 8, 2014

(54) LIQUID DISCHARGE HEAD AND METHOD OF MANUFACTURING THE SAME

(75) Inventors: Osamu Morita, Yokosuka (JP); Kenji Kitabatake, Kawasaki (JP); Satoshi Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/993,240

(22) PCT Filed: May 14, 2009

(86) PCT No.: PCT/JP2009/002115
§ 371 (c)(1),
(2), (4) Date: Nov. 17, 2010

(87) PCT Pub. No.: WO2009/141978
PCT Pub. Date: Nov. 26, 2009

(65) Prior Publication Data
US 2011/0069119 A1    Mar. 24, 2011

(30) Foreign Application Priority Data

May 19, 2008   (JP) ................................ 2008-130762
Apr. 27, 2009  (JP) ................................ 2009-107880

(51) Int. Cl.
*B41J 2/05*    (2006.01)
*B41J 2/145*   (2006.01)

(52) U.S. Cl.
USPC ............................................. 347/65; 347/44

(58) Field of Classification Search
USPC .................. 347/44–47, 85–88, 54, 56, 63, 65
See application file for complete search history.

(56) References Cited

U.S. PATENT DOCUMENTS

| 7,261,397 | B2 | 8/2007 | Morita |
| 2005/0068381 | A1 | 3/2005 | Morita |
| 2007/0277927 | A1 | 12/2007 | Momose |

FOREIGN PATENT DOCUMENTS

| CN | 2451335 Y | 10/2001 |
| CN | 1511709 A | 7/2004 |
| CN | 1583408 A | 2/2005 |
| JP | 2006-341557 A | 12/2006 |
| JP | 2007-283668 A | 11/2007 |
| WO | 2007/005447 A2 | 1/2007 |

*Primary Examiner* — Kevin S Wood
(74) *Attorney, Agent, or Firm* — Canon USA Inc. IP Division

(57) ABSTRACT

A liquid discharge head includes a liquid discharge substrate including a discharge port; a flow path for supplying liquid to the liquid discharge substrate; an absorption member capable of absorbing a laser beam, wherein a first flow path portion constituting a portion of a wall of the flow path is formed on a surface thereof; and a transparent member transparent to a laser beam, wherein a second flow path portion constituting another portion of the wall of the flow path is formed on a surface thereof; wherein the flow path is formed by welding the surfaces of the absorption and transparent members with each other at a periphery of the first flow path portion using a laser beam, and wherein the second flow path portion is constituted by a depression including an inclined surface capable of reflecting a laser beam directed toward the first flow path portion.

13 Claims, 23 Drawing Sheets

LIQUID DISCHARGE HEAD AND METHOD OF MANUFACTURING THE SAME

TECHNICAL FIELD

The present invention relates to a liquid discharge head for recording on a recording medium by, for example, discharging liquid such as ink and a method for manufacturing the liquid discharge head. In particular, the invention relates to a liquid discharge head for performing ink jet recording.

BACKGROUND ART

Ink jet recording heads are examples of liquid discharge heads that are generally known. Referring to FIGS. 11A to 11C, a structure of an ink jet recording head is briefly described.

As shown in FIG. 11A, an ink jet recording head H1001 includes a tank holder unit H1003 and a recording element unit H1002 for discharging ink.

Ink is supplied from an ink tank (not shown) to a recording element unit H1002 through an ink flow path formed in the tank holder unit H1003.

The ink flow path is formed in the tank holder unit H1003 by joining a tank holder H1500 shown in FIG. 11B to a flow path forming member H1600 shown in FIG. 11C.

Known methods for joining the tank holder H1500 to the flow path forming member H1600 include ultrasonic welding (Patent Citation 1) and laser welding (Patent Citation 2).

Among the methods, the laser welding method is described. The term "laser welding" generally refers to a method of making a member being transparent to a laser beam and a member being capable of absorbing a laser beam contact each other and irradiating a region to be welded with a laser beam so as to join the members together.

As compared with ultrasonic welding, laser welding has an advantage in that foreign matter is negligibly generated at the welded portion and is used as effective means for forming an ink flow path.

Referring to FIGS. 12A to 13C, a method of joining a tank holder H1500 to a flow path forming member H1600 by laser welding described in Patent Citation 2 is explained. FIGS. 13A to 13C are schematic sectional views of the tank holder H1500 and the flow path forming member H1600 shown in FIGS. 12A and 12B.

The tank holder H1500, which is capable of absorbing a laser beam, and the flow path forming member H1600, which is transparent to a laser beam, are made to contact each other using a press jig 510 (FIGS. 12A and 13A). Then, while the tank holder H1500 and the flow path forming member H1600 are in contact with each other, a contact surface 600 is irradiated with a laser beam (FIGS. 12B and 13B), so that an ink flow path is formed (FIG. 13C).

Examples of laser irradiation methods include a scanning method described in Patent Citation 2 and a simultaneous irradiation method.

By the scanning method, a desired junction surface is irradiated with a laser beam along a locus in a scanning manner by concentrating the spot diameter of the laser beam emitted from a laser irradiation apparatus 500 as shown in FIGS. 12B and 13B.

By the simultaneous irradiation method, a desired junction surface is irradiated with a laser beam in one go.

[Patent Citation 1] Japanese Patent Laid-Open No. 2007-283668
[Patent Citation 2] U.S. Pat. No. 7,261,397

DISCLOSURE OF INVENTION

Technical Problem

Because the ink flow path and the junction surface have fine structures, the scanning method and the simultaneous irradiation method have the following problems.

The scanning method has a problem in that a very long time is required to scan a junction surface along a fine locus so as to weld the surface.

To be specific, as shown in FIGS. 11B and 11C, a junction surface H1602 and an ink flow path H1601 of the ink jet recording head have fine structures with very small widths. Irradiating areas excluding the ink flow path H1601 as shown in FIG. 13B is extremely time-consuming. Therefore, the scanning method is not suitable for manufacturing a large number of ink jet recording heads.

On the other hand, the simultaneous irradiation method is suitable for manufacturing a large number of ink jet recording heads because less time is required for welding than by the scanning method.

In general, to join members together by laser welding, only a region to be welded is irradiated with a laser beam. However, when a junction surface has a fine structure such as the case in forming an ink flow path in an ink jet recording head, providing a mask in a region corresponding to a fine ink flow and irradiating only the junction surface with a laser beam is difficult.

To be specific, as shown in FIG. 14B, both the contact surface 600 and a region to become the ink flow path H1601 are irradiated with a laser beam at the same time. Therefore, as shown in FIG. 14C, a damaged portion 620 may be formed on the surface of the ink flow path H1601 by the laser beam.

The damaged portion 620 in the ink flow path H1601 may block ink flow and may impair the reliability of the ink jet recording head H1001.

The invention provides an ink jet recording head in which damage to an ink flow path caused by a laser beam is reduced, when members that form the ink flow path are welded together by irradiating a region including the ink flow path with a laser beam.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

A liquid discharge head used in an embodiment is described with an example of a general ink jet recording head.

In this description, the term "recording" not only refers to forming meaningful information such as characters or figures but also to forming meaningless information irrespective of whether the information is visually perceptible to the human eye. Moreover, the term also refers to forming an image, a design, a pattern or the like on a recording medium or processing the recording medium.

The term "recording medium" refers not only to general paper that is used for recording apparatuses but also to any material that can receive ink, such as cloth, a plastic film, a metal plate, glass, a ceramic, wood, and leather.

The term "ink", which should be interpreted in a broad sense as the term "recording medium", refers to liquid that can be used for forming an image, a design, a pattern or the like on a recording medium; liquid for processing a recording medium; and liquid for treating ink. Thus, the term "ink" refers to any liquid that can be used in regard to recording.

An ink jet recording head includes discharge ports for discharging ink and an ink flow path that communicate with the discharge ports so as to supply ink to the discharge ports.

Figure 9A:
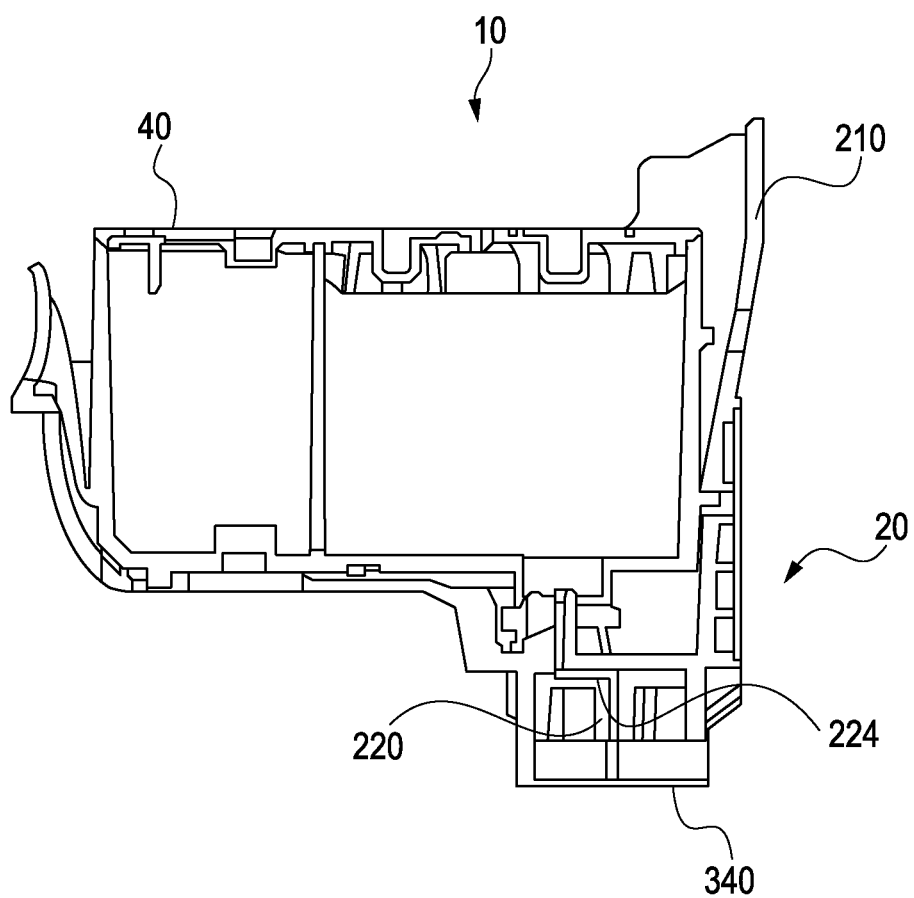
FIG. 9A is a view showing a general ink jet recording head to which the invention is applicable.
Figure 9B:
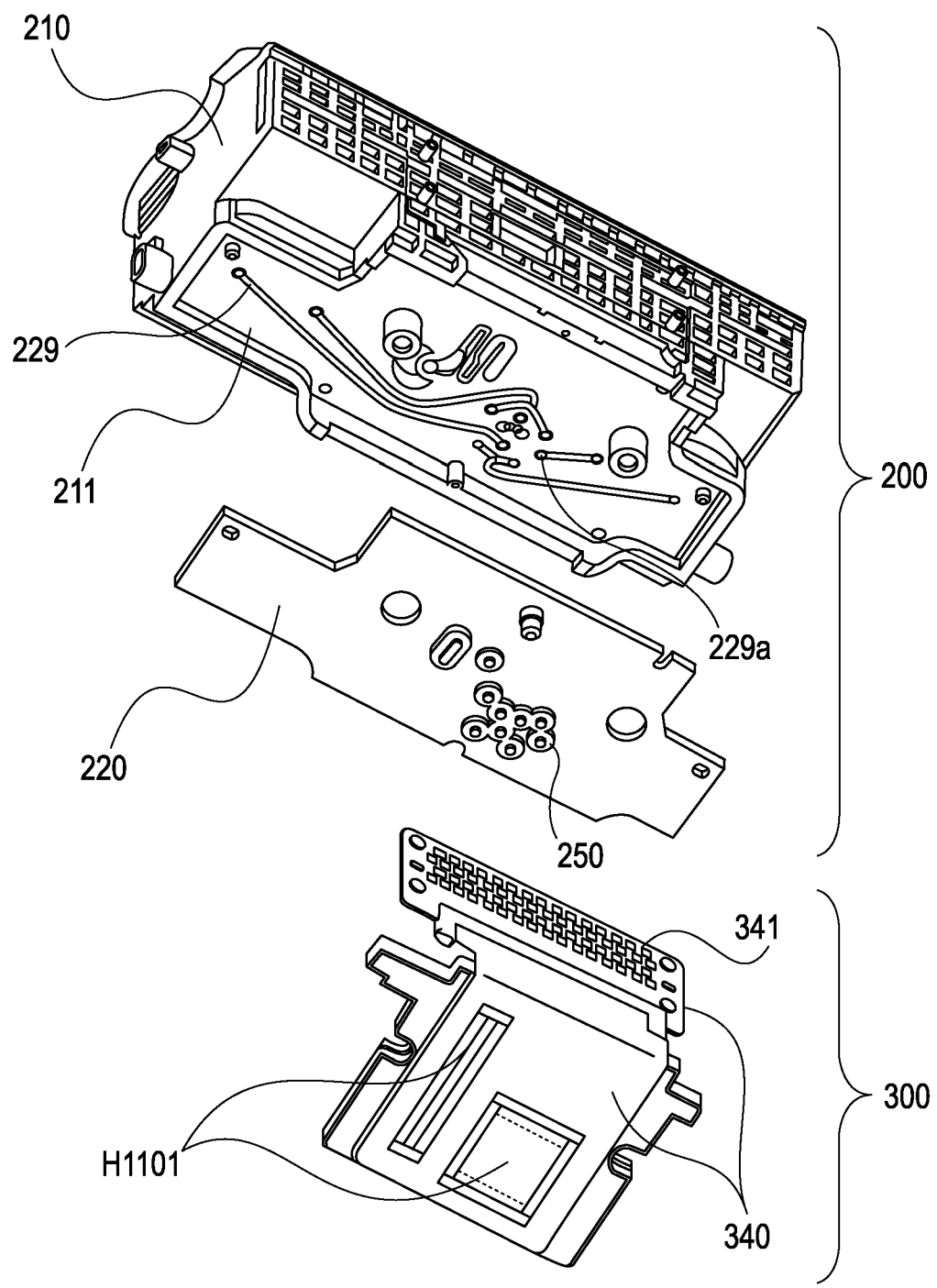
FIG. 9B is a view showing the general ink jet recording head to which the invention is applicable.

Referring to FIGS. 9A to 9C, an ink jet recording head constituting a recording head cartridge is described.

As shown in FIG. 9A, a recording head cartridge 10 includes an ink jet recording head 20 and an ink tank 40. The ink tank 40 is detachably mounted on the ink jet recording head 20.

The recording head cartridge 10 is supported by and fixed to a carriage (not shown) in a detachable manner with positioning members and electric contacts of the carriage. The carriage is installed in an ink jet recording apparatus (not shown), which is hereinafter referred to only as a recording apparatus.

Ink is supplied to the ink jet recording head 20 from the ink tank 40. The ink jet recording head 20 discharges ink from ink discharge ports disposed in a recording element substrate H1101 by driving recording elements in accordance with electric signals sent from the recording apparatus. Examples of the recording elements include exothermic elements and piezoelectric elements. An ink jet recording head using exothermic elements is described here.

FIG. 9B is an exploded perspective view of the ink jet recording head 20 shown in FIG. 9A.

The inkjet recording head 20 includes a recording element unit 300 and a tank holder unit 200. The recording element unit 300 includes an electric wiring substrate 340 and a recording element substrate H1101.

The electric wiring substrate 340 has connection terminals 341 for connecting the electric wiring substrate 340 to the recording apparatus, electrode terminals (not shown) for connecting the electric wiring substrate 340 to the recording element substrate H1101, wiring for connecting the connection terminals 341 to the electrode terminals, and an opening for incorporating the recording element substrate H1101.

The electric wiring substrate 340 is connected to the recording element substrate H1101, for example, in the following manner: electrically conductive thermosetting adhesive resin is applied to electrode portions of the recording element substrate H1101 and to the electrode terminals of the electric wiring substrate 340; and the electrode portions and the electrode terminals are pressed and heated using a heat tool so that the electrode portions and the electrode terminals are electrically connected at the same time. The area in which the electrode portions and the electrode terminals are electrically connected is sealed with a sealing compound so that the area is protected from corrosion by ink or from an external shock.

Figure 10:
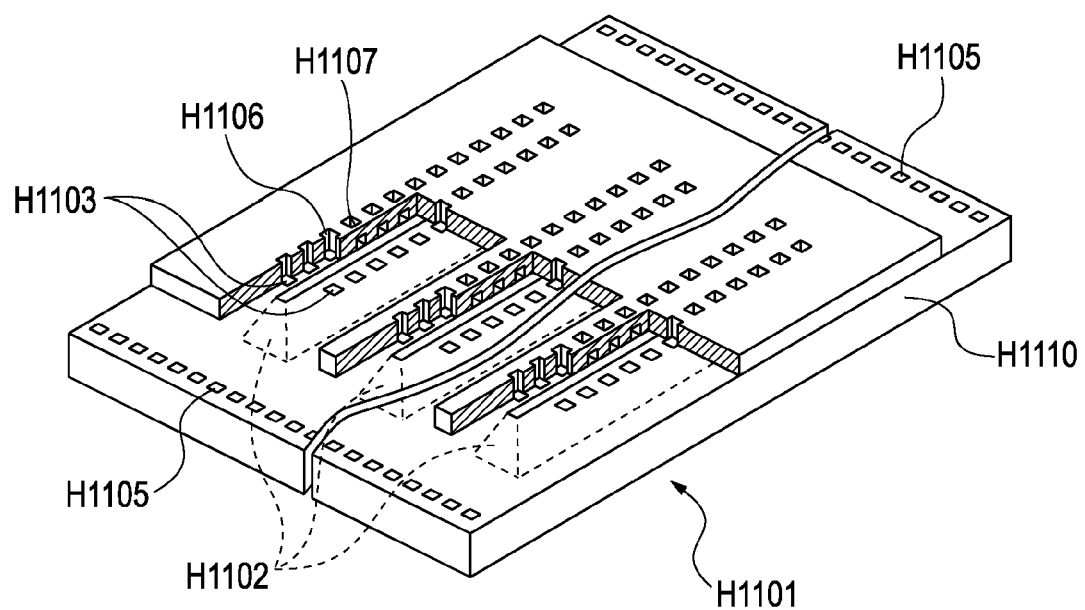
FIG. 10 is a view showing a recording element substrate of a general ink jet recording head.
Figure 11A:
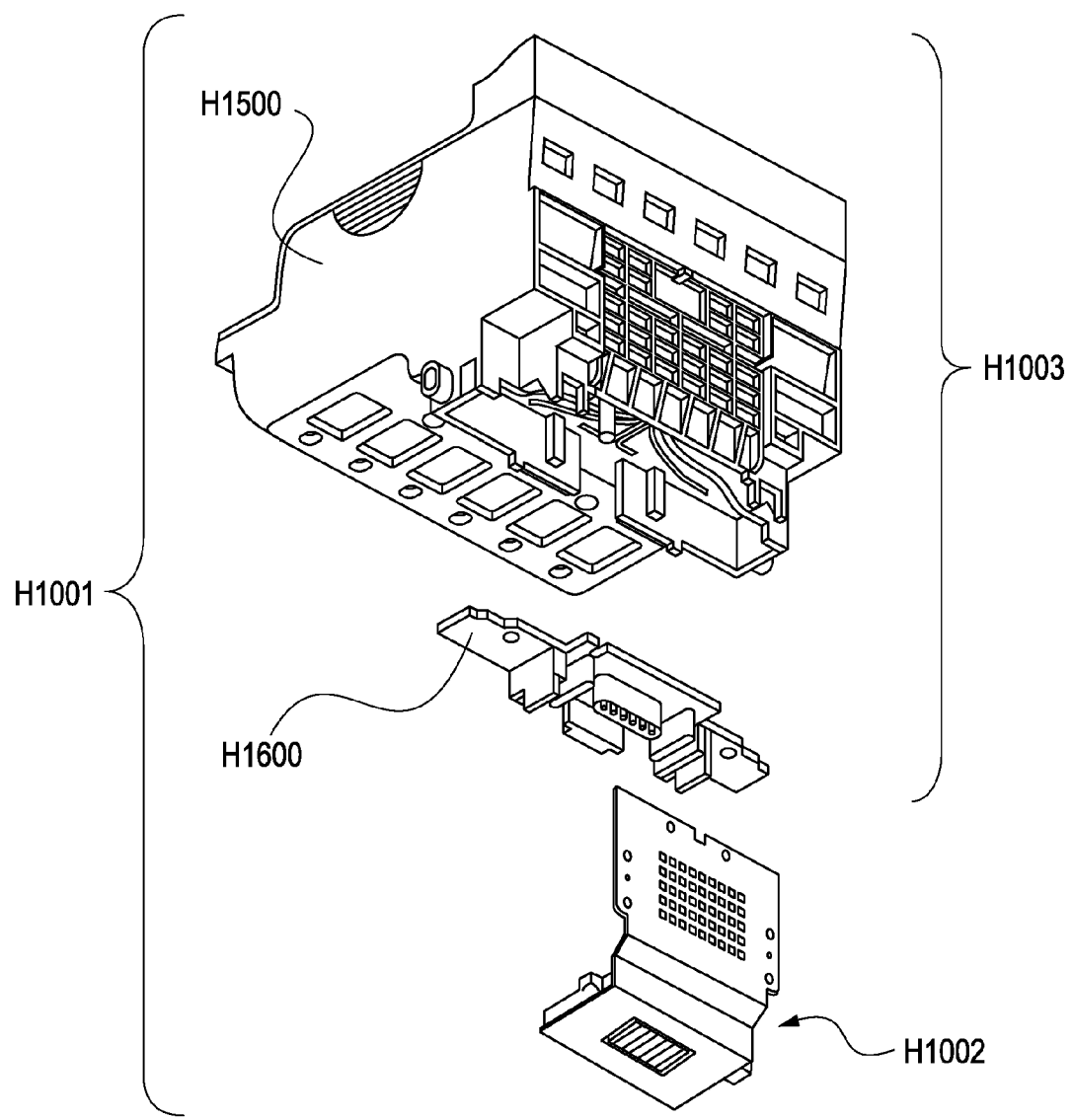
FIG. 11A is an explanatory view of a general ink jet recording head of a related art.
Figure 11B:
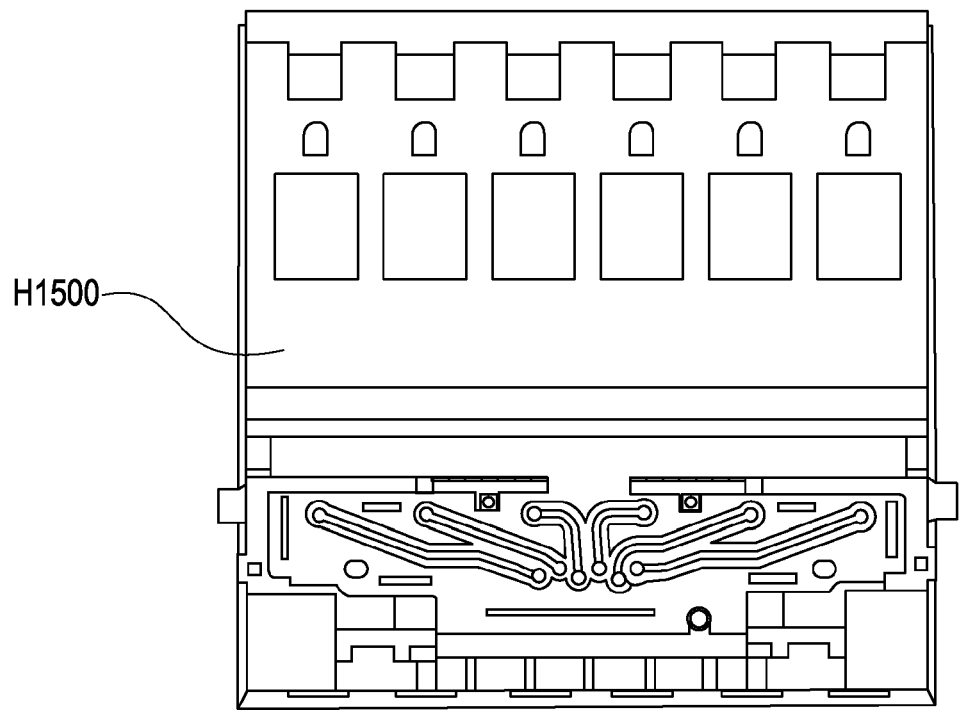
FIG. 11B is an explanatory view of the general ink jet recording head of the related art.
Figure 11C:
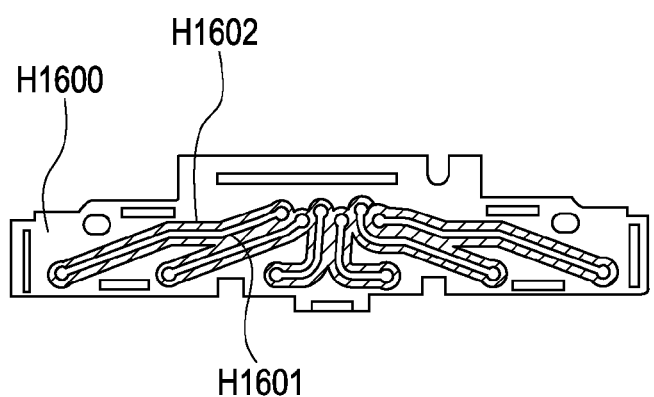
FIG. 11C is an explanatory view of the general ink jet recording head of the related art.
Figure 12A:
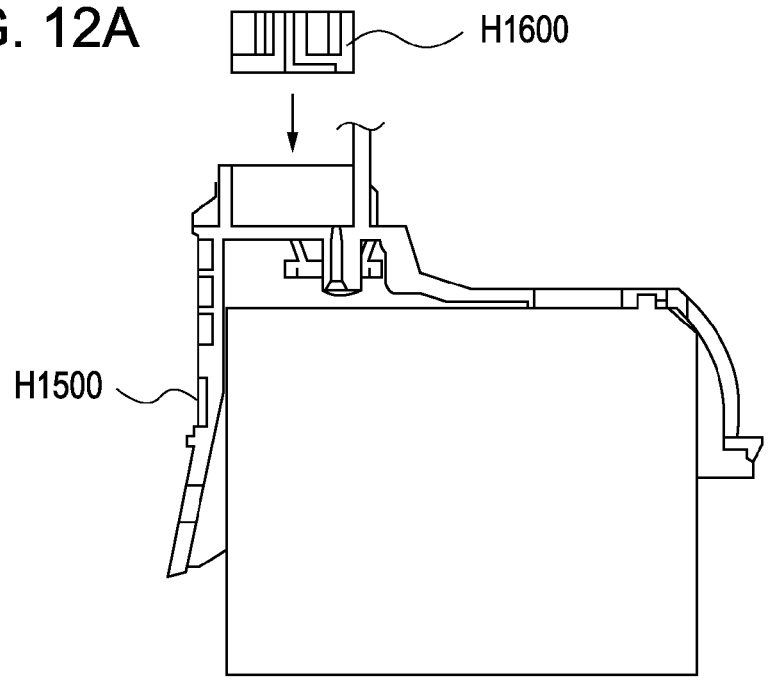
FIG. 12A is an explanatory view of an existing laser welding method.
Figure 12B:
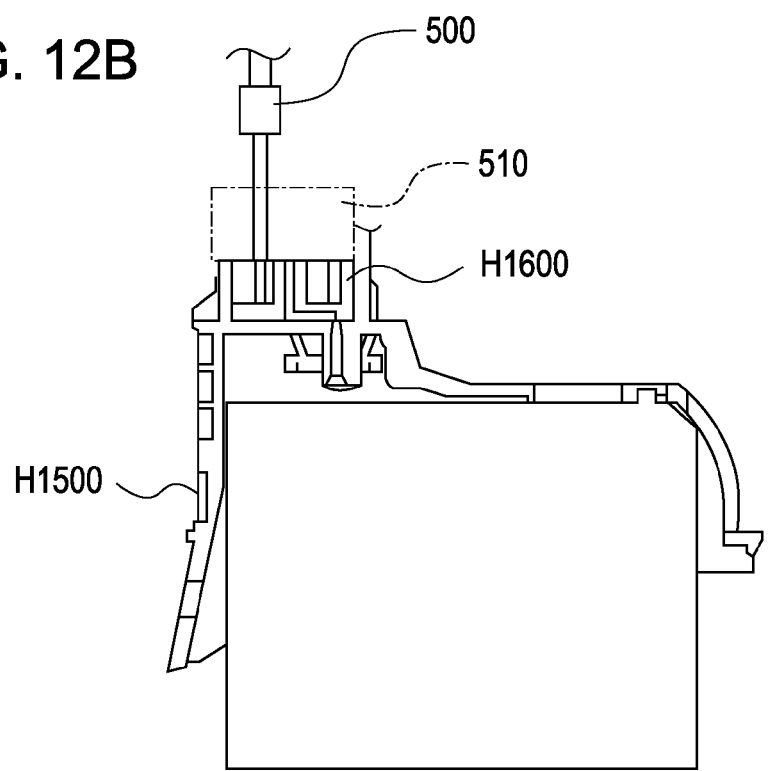
FIG. 12B is an explanatory view of the existing laser welding method.
Figure 13A:
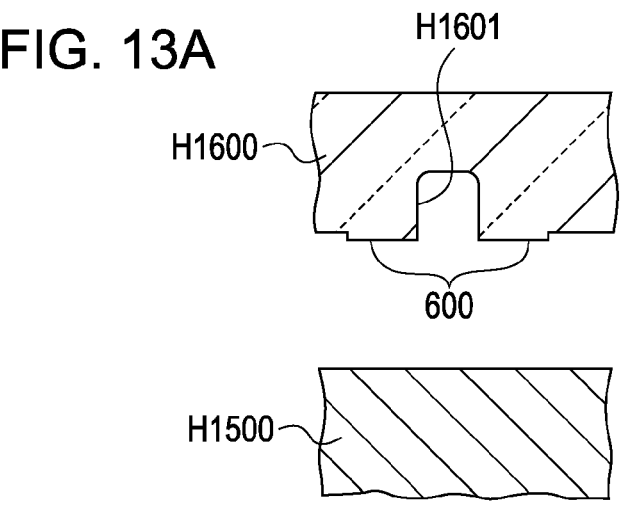
FIG. 13A is an explanatory view of a scanning laser welding method.
Figure 13B:
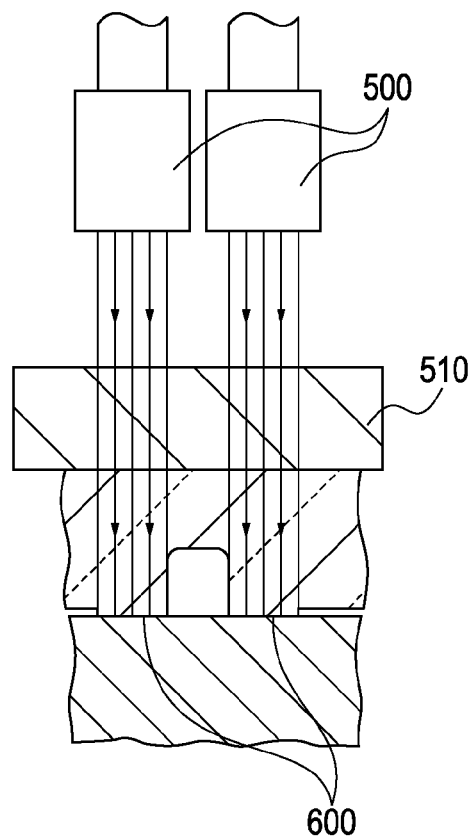
FIG. 13B is an explanatory view of the scanning laser welding method.
Figure 13C:
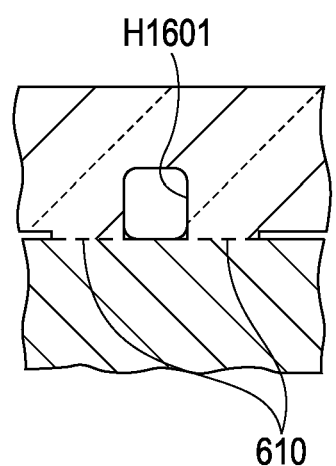
FIG. 13C is an explanatory view of the scanning laser welding method.

FIG. 10 is a partially sectional perspective view for describing a structure of a recording element substrate H1101 serving as a liquid discharge substrate (liquid discharge unit) for discharging ink.

The recording element substrate H1101 includes discharge ports H1107 for discharging ink and ink supply ports H1102 that communicate with the discharge ports and supply ink to the discharge ports. The discharge ports are formed in a discharge port forming member H1106, and the ink supply ports are formed in a silicon substrate H1110.

The silicon substrate H1110 has a thickness of 0.5-1.0 mm. The ink supply ports H1102 are formed in the silicon substrate H1110 by anisotropic etching. Moreover, exothermic elements H1103 are formed on the silicon substrate H1110. The discharge ports H1107 are formed in the silicon substrate H1110 by photolithography in such a manner that the discharge ports H1107 corresponds to the exothermic elements H1103. Furthermore, bumps H1105 made of Au or the like are disposed on the silicon substrate H1110. The bumps H1105 serve as electrode portions for supplying electric signals and electric power for driving the exothermic elements H1103.

Referring to FIG. 9B, the tank holder unit 200 constituting a portion of flow path forming members characterizing the invention, is described in detail.

As shown in FIG. 9B, the tank holder unit 200 is constituted by a tank holder 210 and a second flow path forming member 220. The tank holder 210 includes a first flow path forming member 211 and holds the ink tank 40. The second flow path forming member 220 is joined to the tank holder 210 so as to form an ink flow path. The second flow path forming member 220 has an opening 250 through which the ink flow path communicates with the recording element substrate H1101. The flow path forming members are disposed between the ink tank 40 and the recording element substrate H1101. The recording element substrate H1101 corresponds to a liquid discharge substrate. The flow path forming members serve to supply ink from the ink tank 40 to the recording element substrate H1101 through the ink flow path.

In the embodiment of the invention, the first flow path forming member 211 is integrally formed with the tank holder 210. However, the first flow path forming member 211 and the tank holder 210 may be independently formed. In this case, the first flow path forming member 211 is attached to the tank holder 210.

The first flow path forming member 211 has a first flow path portion 229 in a surface thereof. The first flow path portion 229 constitutes a portion of a wall of an ink flow path 224. The second flow path forming member 220 has a second flow path portion 239 (not shown) in a surface thereof. The second flow path portion 239 constitutes a portion of the wall of the ink flow path 224. The first flow path forming member 211 and the second flow path forming member 220 are joined together with the first flow path portion 229 and the second flow path portion 239 disposed therebetween so that the ink flow path 224 is formed. To provide the structure, it is sufficient that at least one of the first flow path portion and the second flow path portion be formed as a depression (groove) in a surface of a corresponding one of the first flow path forming member and the second flow path forming member.

In order to join the first flow path forming member 211 and the second flow path forming member 220 together by laser welding, it is necessary that one of the flow path forming members be transparent to a laser beam and the other of the flow path forming members be capable of absorbing a laser beam.

In the embodiment of the invention, the second flow path forming member 220 is transparent to a laser beam and the first flow path forming member 211 is capable of absorbing a laser beam so that the flow path forming members can be easily irradiated with a laser beam. Which flow path forming member is provided with transparency or absorption may be changed as appropriate.

In the invention, the phrase "a transparent member being transparent to a laser beam" refers to a member having a transmittance of equal to or greater than 30% when the member of a thickness of 2.0 mm is irradiated with a laser beam. The phrase "an absorption member being capable of absorbing a laser beam" refers to a member having an absorptance of equal to or greater than 90% when the member of a thickness of 2.0 mm irradiated with a laser beam. By using the members having such transmittance and absorptance, the transparent member and the absorption member can be laser welded.

Hereinafter, specific embodiments of the invention are described in detail with reference to the drawings.

First Example

A first example of the invention is described in detail with reference to the drawings.

Figure 1A:
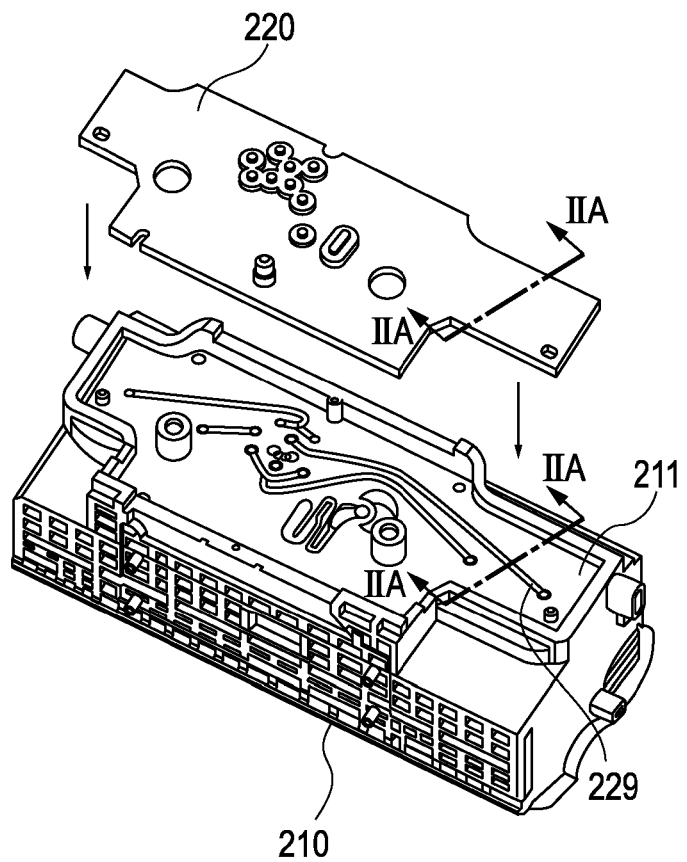
FIG. 1A is a schematic view showing a process of laser welding an ink jet recording head according to an embodiment of the invention.
Figure 1B:
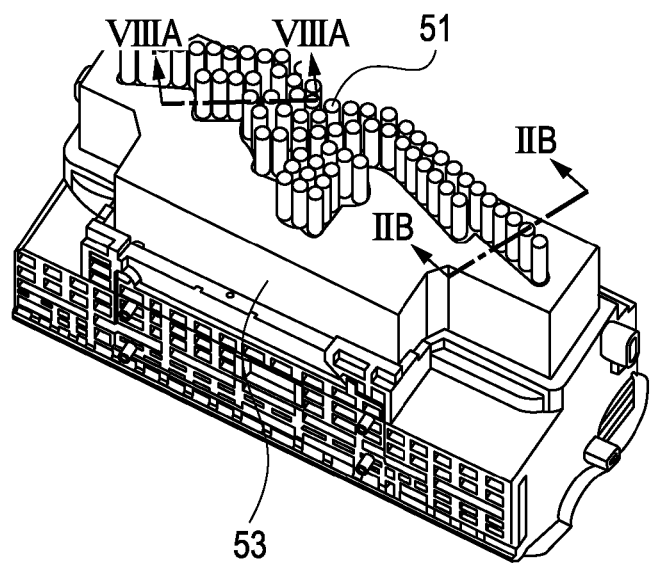
FIG. 1B is a schematic view showing the process of laser welding the ink jet recording head according to the embodiment of the invention.
Figure 1C:
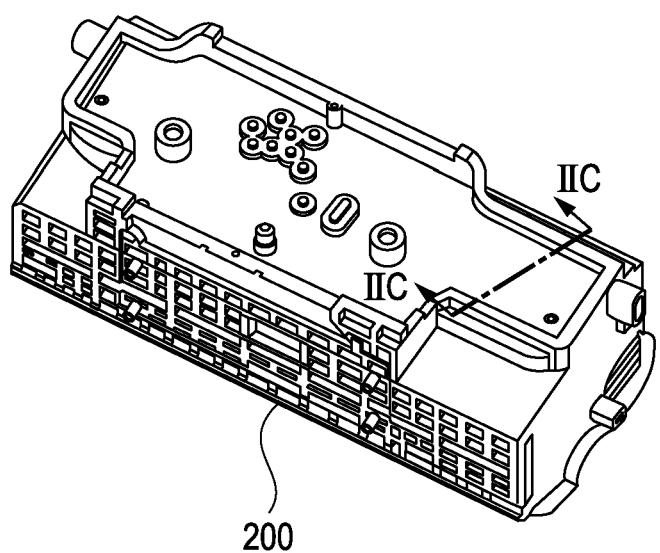
FIG. 1C is a schematic view showing the process of laser welding the ink jet recording head according to the embodiment of the invention.

FIGS. 1A to 1C are perspective views showing a process of attaching a second flow path forming member 220 to a tank holder 210 in which a first flow path forming member 211 is formed. As shown in FIG. 1A, the first flow path forming member 211 has a first flow path portion 229 forming a portion of a wall of an ink flow path. The second flow path forming member 220 has a second flow path portion 239 (shown in FIGS. 2A and 2B) forming a portion of the wall of the ink flow path. The structure of a reflecting portion formed in the second flow path forming member 220, which is described below, is omitted from FIG. 1A.

FIG. 1A shows a process of preparing the second flow path forming member 220 and the first flow path forming member 211, which is integrally formed with the tank holder 210, and making the first and second flow path forming members 211 and 220 contact each other.

FIG. 1B shows a process of irradiating the first and second flow path forming members 211 and 220 with a laser beam using a laser irradiation apparatus 51 after the process shown in FIG. 1A has been finished. The second flow path forming member 220 is pressed with a press jig 53. The press jig 53 is configured such that, among portions of the first flow path forming member, a periphery of the first flow path portion 229 forming a portion of a wall of the ink flow path can be irradiated with a laser beam. In the state in which the first and second flow path forming members 211 and 220 are in close contact with each other, the first flow path portion 229 of the first flow path forming member 211 and the periphery of the first flow path portion 229 are irradiated with a laser beam emitted from the laser irradiation apparatus 51 through the second flow path forming member 220.

FIG. 1C shows a state in which the second flow path forming member 220 and the first flow path forming member 211 are joined together (so as to provide a tank holder unit 200).

Figure 2A:
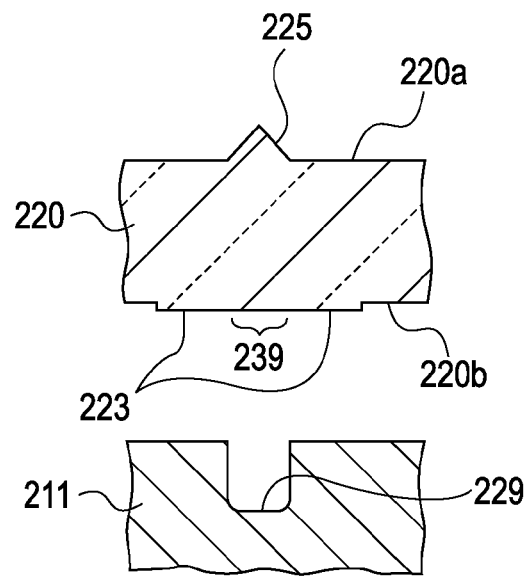
FIG. 2A is an explanatory view of a first example of the invention.
Figure 2B:
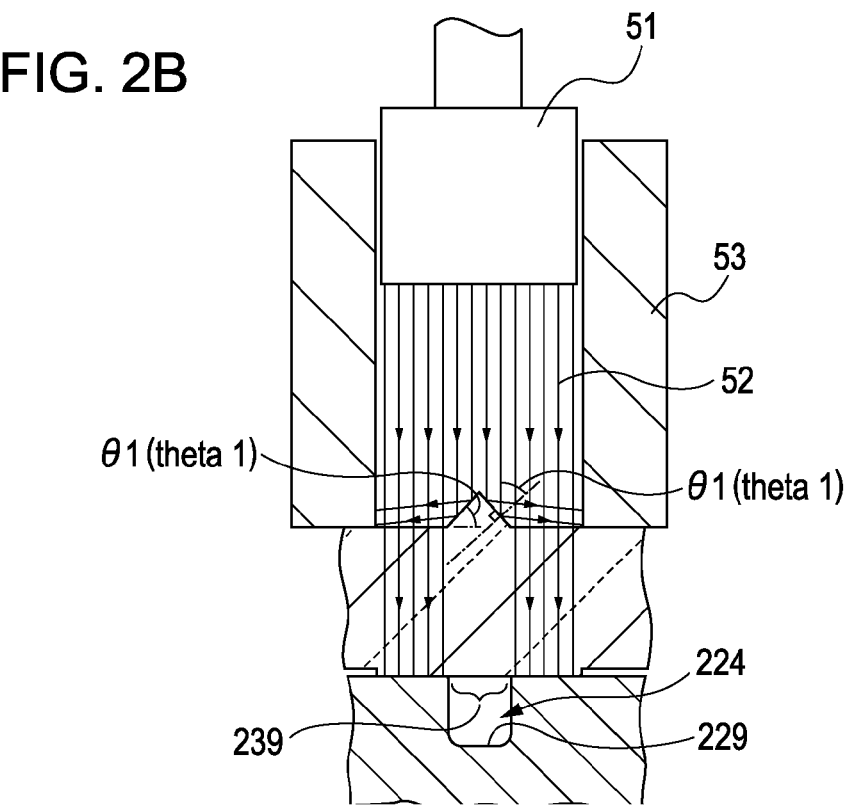
FIG. 2B is an explanatory view of the first example of the invention.
Figure 2C:
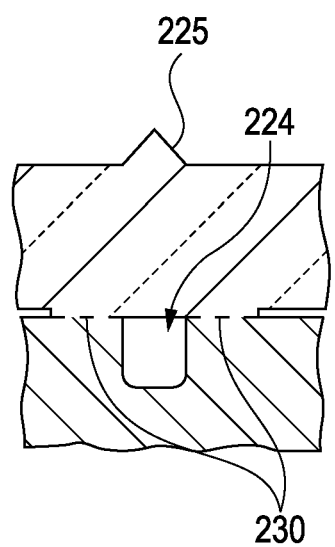
FIG. 2C is an explanatory view of the first example of the invention.
Figure 3A:
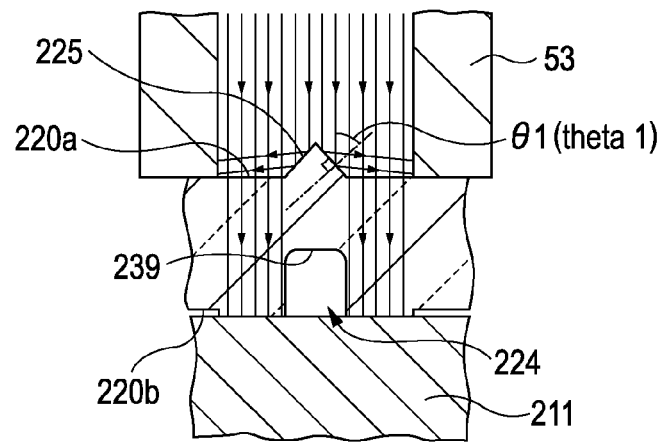
FIG. 3A is a view showing another configuration of the first example of the invention.
Figure 3B:
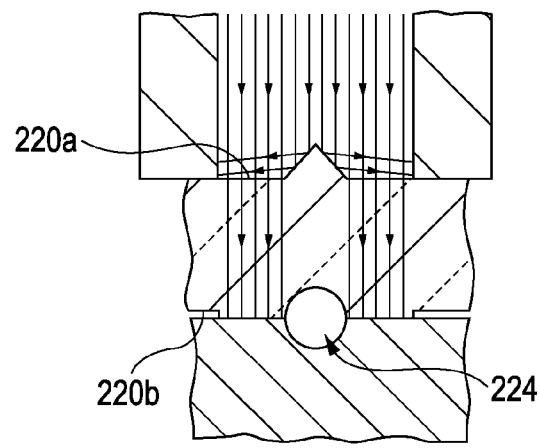
FIG. 3B is a view showing another configuration of the first example of the invention.
Figure 3C:
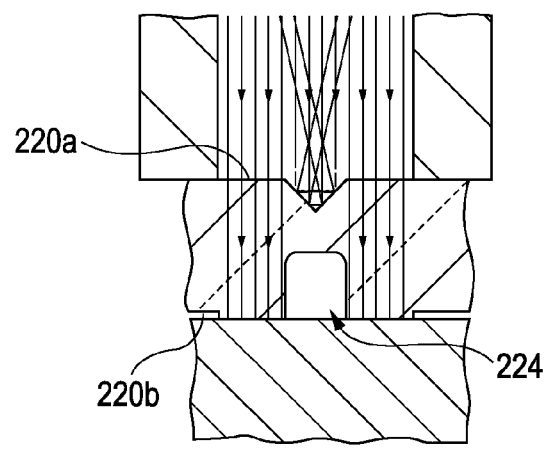
FIG. 3C is a view showing another configuration of the first example of the invention.

FIG. 2A is a sectional view taken along line IIA-IIA of FIG. 1A, FIG. 2B is a sectional view taken along line IIB-IIB of FIG. 1B, and FIG. 3C is a sectional view taken along line IIC-IIC of FIG. 1C. Referring to FIG. 2, specific structures of the first and second flow path forming members are described.

As shown in FIG. 2A, in the first example, a reflecting portion 225, which reflects the laser beam 52 directed toward the first flow path portion 229 forming a portion of a wall of the ink flow path 224, is constituted by inclined surfaces. The inclined surfaces may include flat surfaces and curved surfaces, and, hereinafter, the term "reflecting portion" may be used for the inclined surfaces. The reflecting portion 225 is disposed on a side of the second flow path forming member 220, which is a transparent member, at which the second flow path forming member 220 is irradiated with a laser beam 52. The second flow path forming member 220, which is a transparent member, has a first surface 220a at which the second flow path forming member 220 is irradiated with the laser beam 52 and a second surface 220b that is in contact with the first flow path forming member 211. That is, the second surface 220b is a surface facing the first flow path forming member 211, and the first surface 220a is a surface opposite the surface facing the first flow path forming member 211.

The principal planes of the first surface 220a and the second surface 220b are substantially parallel to each other, excluding a contact surface 223, which is described below, the reflecting portion 225, and members for joining a recording element unit 300 (FIG. 9B) thereto.

The reflecting portion 225 is constituted by flat surfaces that are configured such that a laser beam is incident on the flat surfaces of the reflecting portion 225 at an incident angle theta 1 of, for example, equal to or greater than 45 degrees. Because the laser beam is incident on the principal planes of the first surface 220a and the second surface 220b substantially perpendicularly, the incident angle theta 1 is substantially the same as the angle at which the inclined surfaces are inclined with respect to the principal planes of the first surface 220a and the second surface 220b.

Figure 14A:
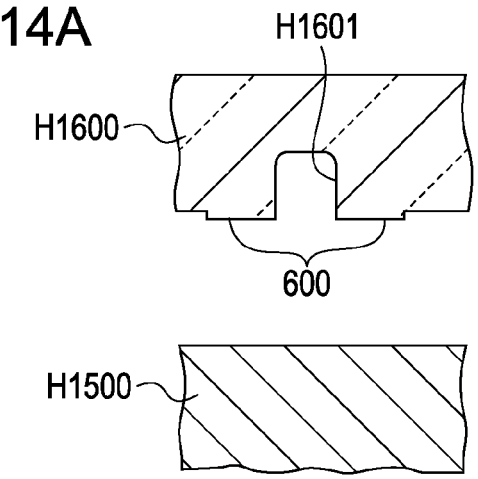
FIG. 14A is an explanatory view of a simultaneous irradiation laser welding method.
Figure 14B:
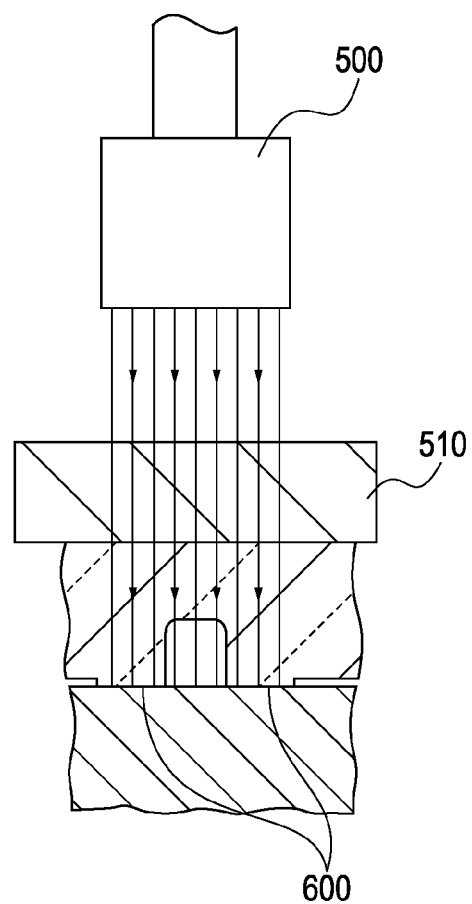
FIG. 14B is an explanatory view of the simultaneous irradiation laser welding method.
Figure 14C:
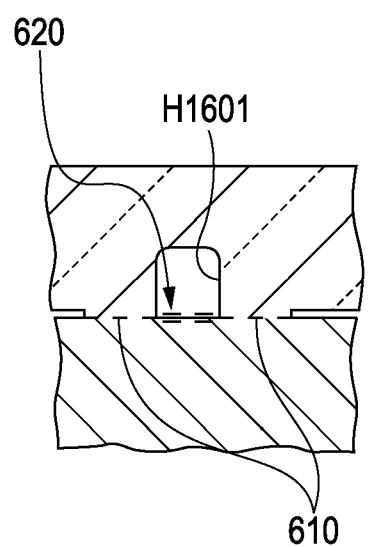
FIG. 14C is an explanatory view of the simultaneous irradiation laser welding method.

As shown in FIG. 2B, because the reflecting portion 225 is disposed in the path of the laser beam 52 emitted toward the first flow path portion 229, the reflecting portion 225 reflects a part or all of the laser beam 52 directed toward the first flow path portion 229, thereby serving to reduce the proportion of the laser beam that reaches the first flow path portion 229. Thus, the ink flow path is prevented from being damaged as described with reference to FIG. 14C. By making the surfaces of the reflecting portion 225 inclined with respect to the principal plane of the first surface 220a such that the laser beam is incident on the second flow path forming member at a large incident angle theta 1, the proportion of the laser beam reflected by the reflecting portion 225 among the laser beam directed toward the first flow path portion 229 can be increased.

The case in which the laser beam that has not been reflected by the reflecting portion 225 passes through the second flow path forming member is described. In the example, the reflecting portion is disposed on the first surface 220a of the second flow path forming member, and the laser beam is refracted when the laser beam passes through the reflecting portion 225 into the second flow path forming member. Thus, the laser beam that has passed through the second flow path forming member is prevented from being directed toward the first flow path portion 229. Even if the laser beam reaches the first flow path portion 229, damage caused by the laser beam to the first flow path portion 229 is small, because the laser beam that reaches the first flow path portion has been attenuated by reflection at the reflecting portion 225 and passage through the second channel forming member.

The inclination angle at which the reflecting portion is inclined with respect to the principal plane of the first surface of the second channel forming member, i.e., the incident angle theta 1, may be set as appropriate such that the reflecting portion can reflect the laser beam, because the angle depends on the wavelength lambda of the laser beam and the specularity of the reflecting portion 225.

Next, a welding portion at which the first flow path forming member and the second flow path forming member are welded together is described in detail. The first and second flow path forming members 211 and 220 are configured to be in contact with each other in the periphery of the flow path portions 229 and 239 that is irradiated with a laser beam, wherein the flow path portions 229 and 239 constitute portions of the wall of the ink flow path 224. The first and second flow path forming members 211 and 220 are also configured not to be in contact with each other in the portions that are not irradiated with the laser beam.

The first and second flow path forming members 211 and 220 are in contact with each other on a contact surface 223. By providing a contact portion and a non-contact portion, the first and second flow path forming members 211 and 220 can be made to contact each other in such a manner that a pressure is applied only to the contact portion (contact surface 223) so that cohesion at the contact portion (contact surface 223) is improved.

As shown in FIG. 2B, when the contact surface 223 is irradiated with a laser beam, dyes or pigments included in the first flow path forming member 211 (absorption member) are heated and a resin of the dyes or pigments is melted. The heat generated at this time is transferred to the second flow path forming member 220. The second flow path forming member 220 is melted by the heat, so that a junction surface 230 is formed. At this time, the heat is efficiently transferred through the contact surface 223. Moreover, because the cohesion at the contact surface 223 is high as described above, the junction surface 230 shown in FIG. 2C is strong.

In the first example, the reflecting portion 225 disposed on the first surface 220a is configured to reflect a part or all of the laser beam emitted toward the first flow path portion 229 constituting a portion of a wall of the ink flow path. The shape of the reflecting portion 225 is not limited to the shape shown in FIG. 2 nor is it limited by the shape of the section of the ink flow path 224. Other configurations capable of reflecting a part or the entire laser beam have a similar advantage.

Referring to FIG. 3, other configurations of the first example are described.

In FIG. 3A, only the flow path portion 239 of the second flow path forming member 220 is formed as a depression (groove) in the second surface 220b. When the first and the second flow path forming members are joined together, the ink flow path 224 has a substantially rectangular section. With this structure, a surface of the first flow path forming member can be made flat.

In FIG. 3B, both the flow path portion 229 of the first flow path forming member 211 and the flow path portion 239 of the second flow path forming member 220 are formed as depressions (grooves). As shown in FIG. 3B, when the first and second flow path forming members are joined together, the ink flow path 224 has a substantially circular section. This structure has an advantage in that foreign matter or bubbles do not easily build up in the ink flow path, because the section of the ink flow path 224 is substantially circular.

In FIG. 3C, the reflecting portion 225 has a depressed shape, in contrast to the shape protruding from the first surface 220a as shown in FIGS. 2A to 2C. With this structure, interference between components occurring when the ink jet recording head is assembled can be suppressed as described above. Moreover, the thickness of the flow path forming member can be reduced so as to miniaturize the recording head.

In the embodiment, transparent Noryl "TPN9221" (made by SABIC Innovative Plastics that was formerly GE Plastics) is used as a material of the transparent member. Transparent Noryl is a transparent material that allows a laser beam to pass therethrough and is highly resistant to corrosion due to ink. Alternatively, transparent Noryl "TN300" (made by SABIC Innovative Plastics), which does not include a coloring material, can be used as the material of the transparent member.

The term "Noryl" is a common name for modified polyphenylene ether or modified polyphenylene oxide. Noryl is a thermoplastic resin made by modifying polyphenylene ether (polyphenylene oxide) so as to provide a strong resistance to acids and alkalis.

As a material of the absorption member, black Noryl "SE1X" (made by SABIC Innovative Plastics), which includes a dye or a pigment that absorbs a laser beam, is used.

In the description above, an example in which the reflecting portion on the first surface is constituted by two flat surfaces is used. However, the structure of the reflecting portion is not limited to the example. To be specific, the reflecting portion may be constituted by one flat surface, three or more flat surfaces, one or more curved surfaces, or a combination of flat surfaces and curved surfaces, as long as the reflected portion is disposed on the first surface so that a laser beam can be reflected.

First Embodiment

Next, a first embodiment of the invention is described.

Methods for laser welding and materials for the flow path forming member are not described here because they are similar to those in the first example. The structure of a reflecting portion characterizing the invention disposed in a second flow path forming member 220, which is a transparent member, is described in detail.

Figure 4A:
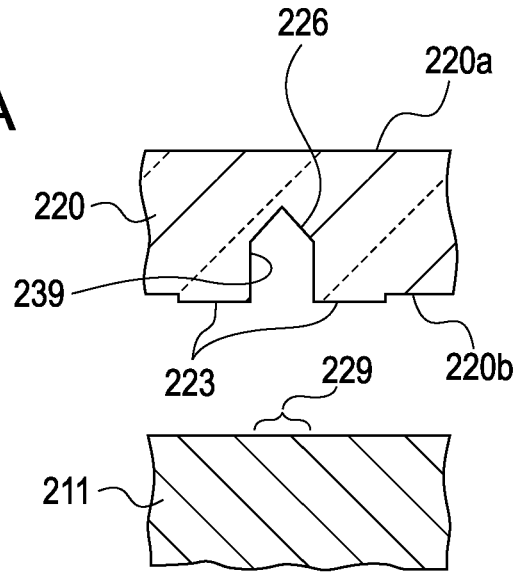
FIG. 4A is an explanatory view of a first embodiment of the invention.

As shown in FIG. 4A, in the first embodiment, a reflecting portion 226 is formed in a second surface 220b of the second flow path forming member 220, and the reflecting portion 226 constitutes a portion of an ink flow path 224.

Figure 4B:
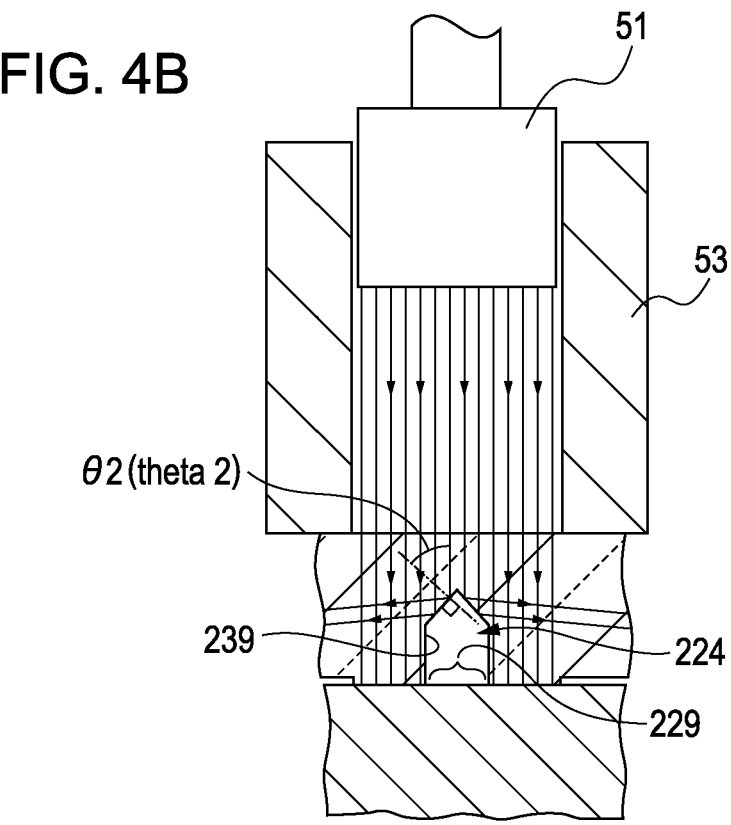
FIG. 4B is an explanatory view of the first embodiment of the invention.

Referring to FIG. 4B, a laser beam 52 passes through a first surface 220a because the first surface 220a of the second flow path forming member 220 (transparent member) is flat, and the laser beam is reflected by the reflecting portion 226 formed in the second surface 220b.

As described above using FIG. 2A, in the first example, the reflecting portion 225 is formed on the first surface 220a in a protruding manner. However, with the structure of the first embodiment, it is not necessary to form a reflecting portion in a protruding manner on the first surface 220a. Thus, when an ink jet recording head is assembled as shown in FIG. 9, the probability of interference between the second flow path forming member 220 of the tank holder unit 200 and components of the recording element unit 300 is reduced.

With the first embodiment, the laser irradiation apparatus is less likely to be damaged because the laser beam 52 reflected by the reflecting portion 226 is not directed toward the laser irradiation apparatus 51.

FIGS. 5A to 5D show other configurations of the first embodiment. As shown in FIGS. 5A to 5D, the area of the section of the ink flow path 224 taken perpendicular to the direction in which ink flows can be made large by forming a groove in the first flow path portion 229 that forms a portion of a wall in the first flow path forming member.

Figure 5A:
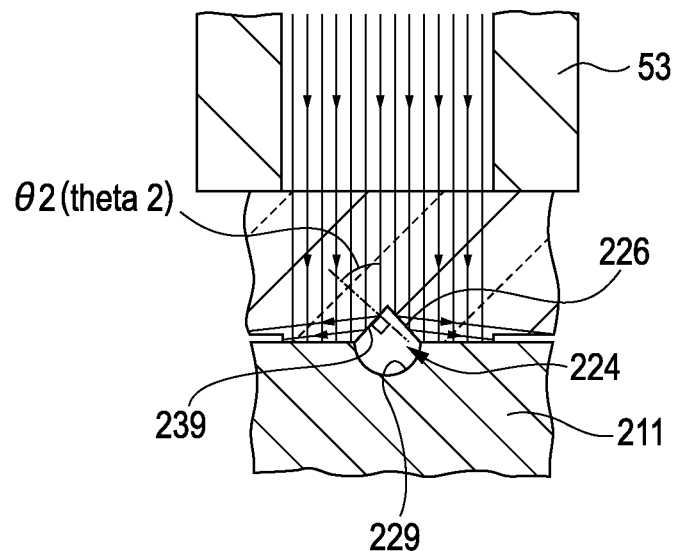
FIG. 5A is a view showing another configuration of the first embodiment of the invention.
Figure 5B:
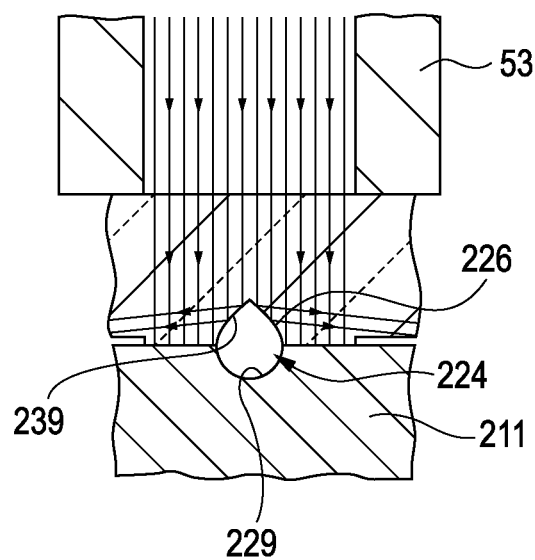
FIG. 5B is a view showing another configuration of the first embodiment of the invention.
Figure 5C:
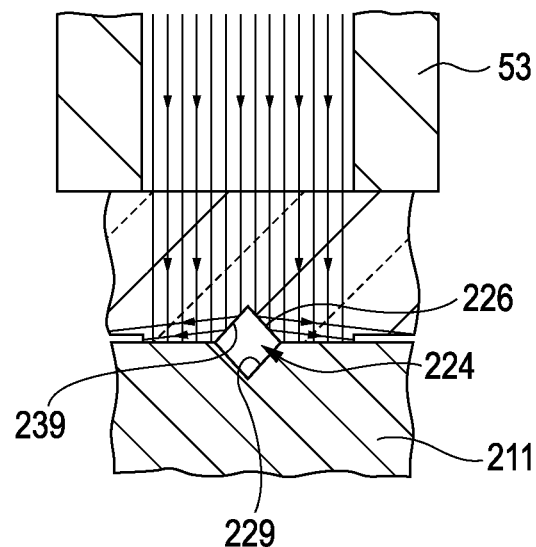
FIG. 5C is a view showing another configuration of the first embodiment of the invention.
Figure 5D:
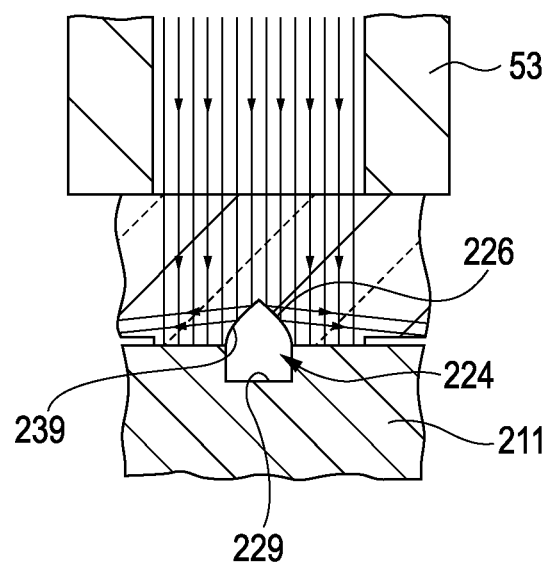
FIG. 5D is a view showing another configuration of the first embodiment of the invention.

As shown in FIG. 5A, the depression constituting the first flow path portion 229 has a semicircular section when the section is taken perpendicular to the direction in which ink flows. With the semicircular section, ink smoothly flows in the ink flow path, so that bubbles and foreign matter can be easily removed when ink is forcedly passed through the ink flow path 224.

In the first embodiment, the reflecting portion 226 may be formed in such a manner that the laser beam 52 that has passed through the first surface is reflected by a flat or curved surface of the reflecting portion. An appropriate incident angle theta 2 of the laser beam 52 on the flat surface or the tangent plane of the curved surface, i.e., the inclination angle of the reflecting portion 226 with respect to the principal plane of the second surface 220b, can be determined from the index of refraction of the transparent member and the index of refraction of a material that fills the ink flow path 224.

For example, the index of refraction of the transparent member made of a general transparent resin is approximately 1.5 for a laser beam having a wavelength lambda in the range of 800 to 1000 nm. If the ink flow path 224 is filled with air having an index of refraction of approximately 1.0, the laser beam can be totally reflected by the reflecting portion 226, when the reflecting portion 226 is configured such that the incident angle theta 2 of the laser beam on the flat surface or the tangent plane of the curved surface is greater than approximately 42 degrees, which is the critical angle.

Even if the incident angle theta 2 is smaller than the critical angle, when the reflecting portion is configured as shown in FIG. 4B and FIGS. 5A to 5D, the laser beam is prevented from being directed toward the first flow path portion 229, because the laser beam is refracted when the laser beam passes through the reflecting portion 226.

As described above, in the embodiment, the transparent Noryl "TPN9221" (made by SABIC Innovative Plastics) is used for the second channel forming member. In the embodiment, the laser beam having a wavelength lambda of 808 nm is used as an example, and the index of refraction of the second channel forming member is approximately 1.57 at the wavelength. Thus, in the embodiment, the inclination angle of the reflecting portion 226 with respect to the principal plane of the second surface is set such that the laser beam is incident on the flat surface or the tangent plane of the reflecting portion 226 at the incident angle of theta 2 that is greater than approximately 40 degrees.

Because the flow path portion, which constitutes a portion of a wall of the ink flow path, is thus formed by the reflecting portion, it is not necessary that the reflecting portion be formed on the first surface. Therefore, the first surface of the second flow path forming member can be made flat, so that the probability of interference between components when the ink jet recording head is assembled is decreased.

As described above in regard to the first embodiment, it is sufficient that the reflecting portion, which characterizes the invention, which is disposed on the second surface of the second flow path forming member be configured to be capable of reflecting a laser beam. To be specific, the reflecting portion may be constituted by one or more flat surfaces or a combination of flat surfaces and curved surfaces.

Second Example

Next, a second example of the invention is described.

Figure 4C:
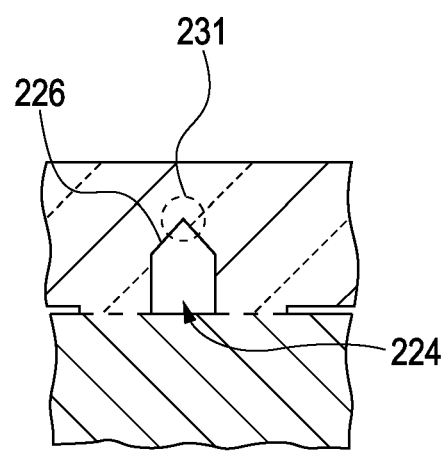
FIG. 4C is an explanatory view of the first embodiment of the invention.

In the example, reflecting portions are formed on a first surface 220a and a second surface 220b of a second flow path forming member 220 so as to prevent a corner portion 231 as shown in FIG. 4C to be formed in an ink flow path. As can be seen from FIG. 9A, the corner portion 231 is positioned in a lower part of an ink jet recording head in the gravitational direction while the ink jet recording head is being used.

Figure 6A:
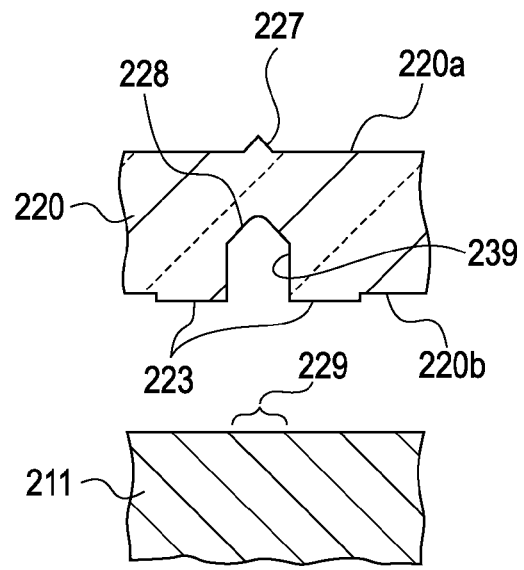
FIG. 6A is an explanatory view of a second example of the invention.

To be specific, as shown in FIG. 6A, a reflecting portion 228 is formed in the second surface 220b so that the reflecting portion 228 reflects a part of a laser beam 52 directed toward the ink flow path. Moreover, a reflecting portion 227 is formed on an area of the first surface 220a corresponding to an area of the second surface 220b in which the reflecting portion 228 is not formed.

Figure 6B:
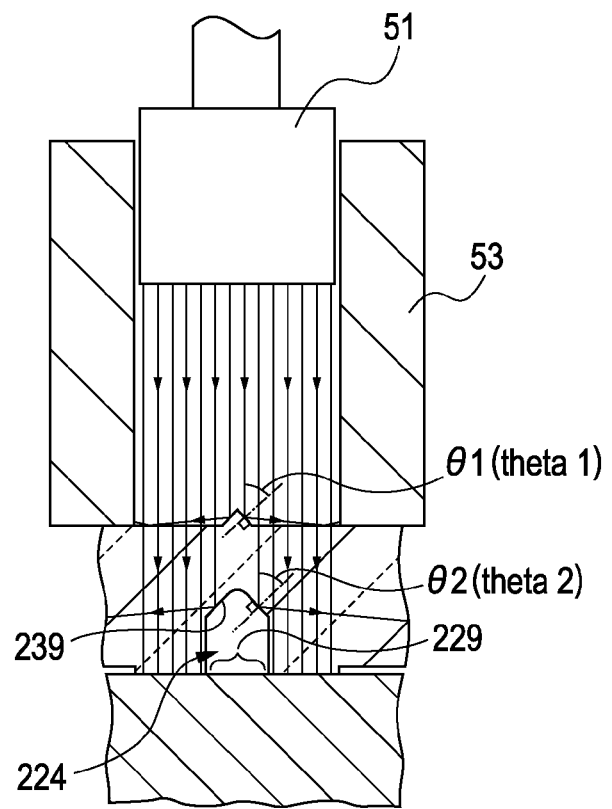
FIG. 6B is an explanatory view of the second example of the invention.
Figure 6C:
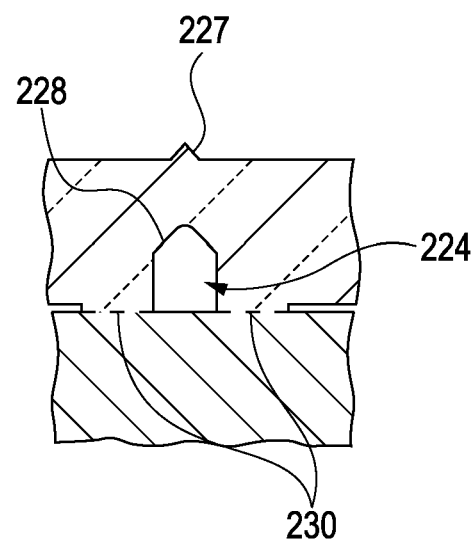
FIG. 6C is an explanatory view of the second example of the invention.

As shown in FIG. 6B, with this structure, the laser beam 52 directed toward the ink flow path is reflected by the reflecting portions 227 and 228, so that the proportion of laser beam that reaches the ink flow path 224 is reduced.

Moreover, because no corner portion is present in a lower part of the ink jet recording head in the gravitational direction while the ink jet recording head is being used, ink can smoothly flow through the ink flow path when the ink is forcedly passed through the ink flow path 224, so that bubbles and foreign matter can be easily removed.

Moreover, because the reflecting portion formed on the first surface 220a of the second flow path forming member 220 is smaller as compared with the reflecting portion in the first embodiment, although the reflecting portion has a protruding shape, the probability of interference between the components of the second flow path forming member 220 and a recording element unit 300 is reduced.

Furthermore, although the reflecting portion formed in the first surface 220a has a depressed shape, the thickness of the second flow path forming member 220 corresponding to the ink flow path is not reduced considerably because the reflecting portion is small, so that the formability of the second flow path forming member 220 is not seriously affected.

Figure 7A:
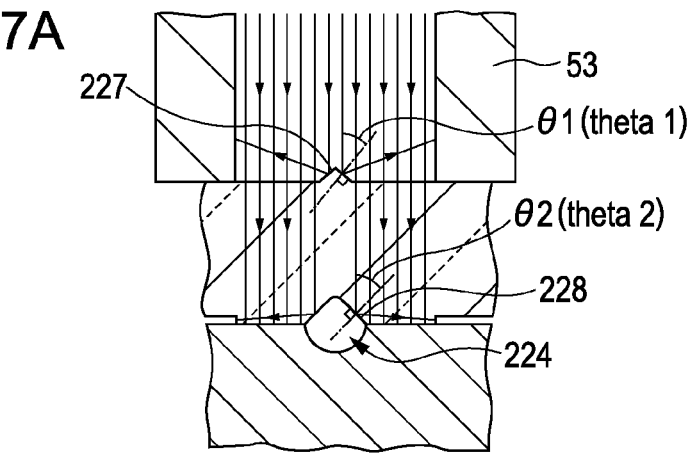
FIG. 7A is a view showing another configuration of the second example of the invention.
Figure 7B:
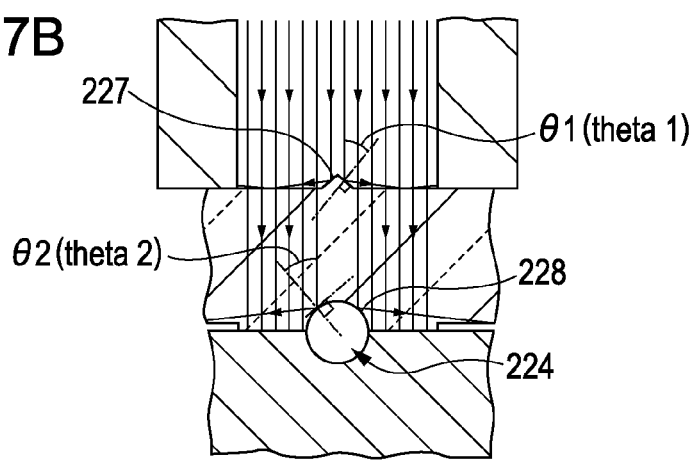
FIG. 7B is a view showing another configuration of the second example of the invention.
Figure 7C:
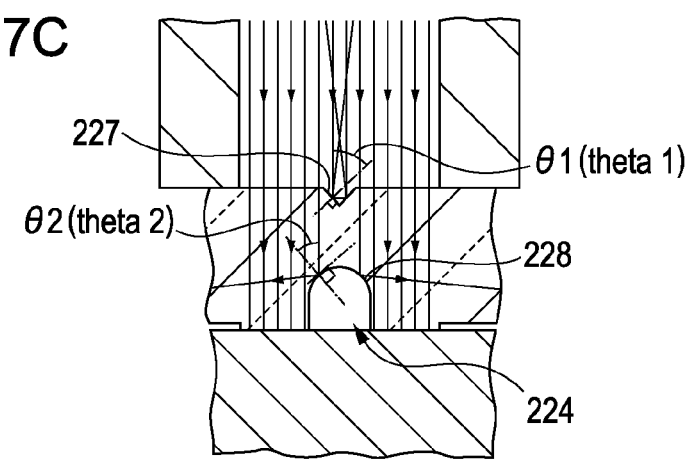
FIG. 7C is a view showing another configuration of the second example of the invention.

Other configurations of the second example shown in FIG. 7 have the same advantage.

As described above, with the second example, the inclined surfaces (reflecting portion) formed in/on the second flow path forming member 220 reflect a laser beam so that the proportion of laser beam that reaches the ink flow path 224 is reduced. Moreover, the periphery (contact surface 223) of a first flow path portion 229, which forms a portion of a wall of the ink flow path, can be irradiated with a laser beam so that the periphery is welded. In other words, in the second example, principal planes of the first and second flow path forming members are perpendicularly irradiated with a laser beam, and an inclined surface for reflecting the laser beam is formed in/on at least one of the first surface 220a and the second surface 220b in a region onto which the ink flow path 224 is projected in the direction of the laser beam.

With this structure, the ink flow path is less likely to be damaged when the ink flow path is formed in the ink jet recording head by laser welding.

Second Embodiment

Next, a second embodiment of the invention is described.

Regarding the structures similar to those in the first embodiment and the first and second examples, description is omitted and like numerals are attached to corresponding portions. Descriptions of a method of laser welding and materials for flow path forming members and a flow path plate are omitted because they are similar to those in the first embodiment and the first and second examples.

Figure 8A:
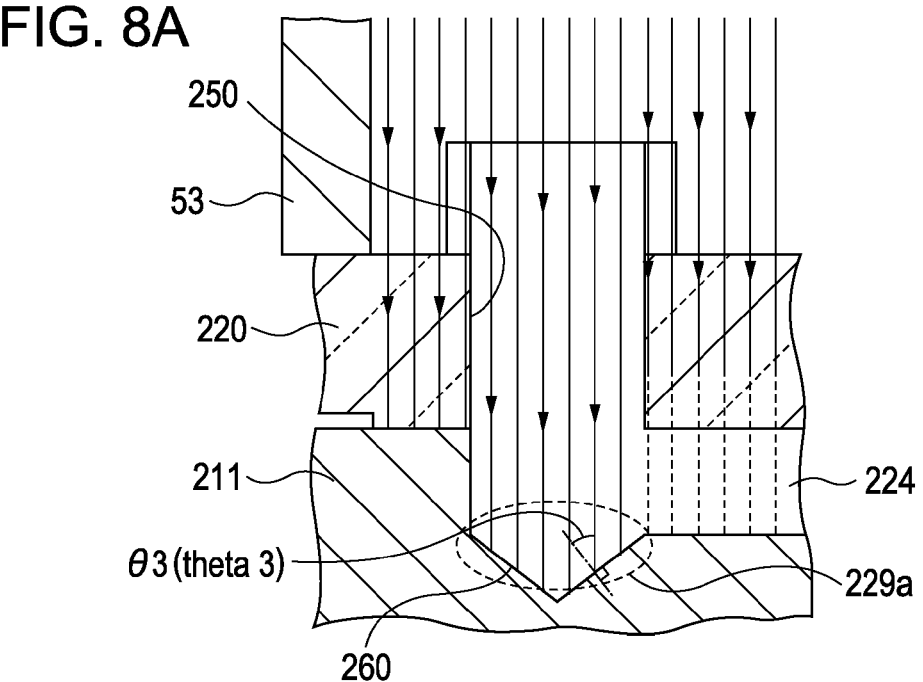
FIG. 8A is an explanatory view of a second embodiment of the invention.
Figure 8B:
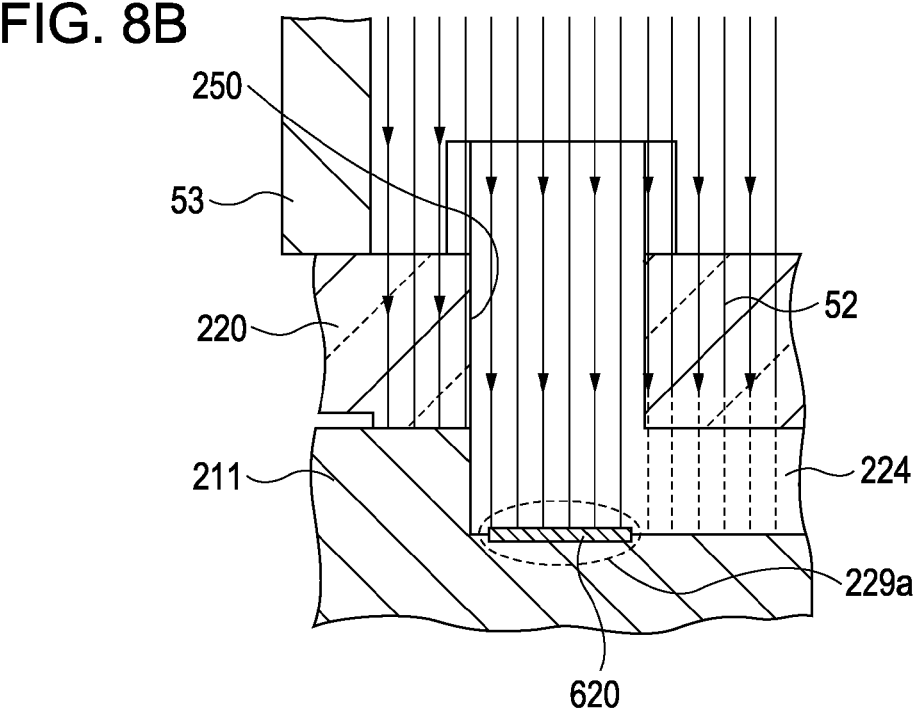
FIG. 8B is an explanatory view of a case in which the second embodiment is not adopted.

By adopting a structure of the second embodiment instead of that of the first embodiment, damage caused by a laser beam to the first flow path portion is further reduced. Referring to FIGS. 8A and 8B, the second embodiment is described in detail.

FIG. 8A is a sectional view taken along VIIIB-VIIIB of FIG. 1B for describing the structure of the first flow path portion 229. FIG. 8B is an explanatory view for describing damage caused to the ink flow path 224 to which the structure of the embodiment is not adopted.

As shown in FIG. 8B, a damaged portion 620 may be formed by laser irradiation in a region 229a of a first flow path portion 229 irradiated with a laser beam that has passed through an opening 250 formed in a second flow path forming member 220. That is, the damaged portion 620 formed in the region 229a of the first flow path portion is directly irradiated with the laser beam 52 that has not passed through the second flow path forming member, which is a transparent member. The damage caused to the region 229a of the first flow path portion by the laser beam that has passed through the opening 250 and with which the region is directly irradiated is greater than the damage caused to the first flow path portion 229 by the laser beam that has passed through the second flow path forming member.

With the second embodiment, the damage caused to the region 229a by the laser beam is reduced with the following structures.

As shown in FIG. 8A, in the embodiment, the region 229a of the ink flow path 224 directly irradiated with the laser beam is constituted by an inclined surface 260 inclined with respect to a principal plane of a surface of the first flow path forming member. The inclined surface 260 has a conical shape. With this structure, the incident angle theta 3 of the laser beam, with which the inclined surface 260 is directly irradiated, becomes large, so that the amount of energy provided by the laser light to a unit area of the region 229a becomes smaller as compared with a case in which the region 229a shown in FIG. 8B is not constituted by the inclined surface 260. Moreover, if a portion of the laser beam is reflected by the inclined surface 260 and the remaining portion is absorbed, the amount of energy provided by the laser light to a unit area of the region 229a becomes further smaller. Thus, damage caused to the region 229a by the laser beam can be reduced.

The structure of the inclined surface 260 is not limited to the configuration in FIG. 8A. As long as the inclined surface 260 is inclined with respect to the direction of the laser beam 52, an advantage similar to that of the structure shown in FIG. 8A can be gained. For example, the inclined surface may be constituted by a flat surface or a curved surface, two or more flat surfaces or curved surfaces, or a combination of flat surfaces and curved surfaces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130762, filed May 19, 2008, and No. 2009-107880, filed Apr. 27, 2009, which are hereby incorporated by reference herein in their entirety.

EXPLANATION OF REFERENCE 20 ink jet recording head
51 laser irradiation apparatus
52 laser beam
224 ink flow path
211 first flow path forming member (absorption member)

220 second flow path forming member (transparent member)
220a first surface
220b second surface
225-228 inclined surface (reflecting portion)
229 first flow path portion
239 second flow path portion
H1001 recording element substrate
H1107 discharge port

The invention claimed is:

1. A liquid discharge head comprising:
a liquid discharge substrate including a discharge port for discharging liquid;
a flow path for supplying liquid to the liquid discharge substrate;
an absorption member being capable of absorbing a laser beam, wherein a first flow path portion constituting a portion of a wall of the flow path is formed on a surface of the absorption member; and
a transparent member being transparent to a laser beam, wherein a second flow path portion constituting another portion of the wall of the flow path is formed on a surface of the transparent member,
wherein the flow path is formed by welding the surface of the absorption member and the surface of the transparent member with each other at a periphery of the first flow path portion using a laser beam emitted through the transparent member toward the first flow path portion and the periphery of the first flow path portion, and
wherein the second flow path portion is constituted by a depression in a principal plane of the surface of the transparent member, and the depression includes an inclined surface inclined with respect to the principal plane of the surface of the transparent member in such a manner that the inclined surface is capable of reflecting a laser beam directed toward the first flow path portion.

2. The liquid discharge head according to claim 1, wherein the first flow path portion is constituted by a depression in a principal plane of the surface of the absorption member.

3. The liquid discharge head according to claim 2, wherein the depression constituting the first flow path portion has a semicircular section, the section being taken perpendicular to a direction in which liquid flows in the flow path.

4. The liquid discharge head according to claim 2, wherein the depression constituting the first flow path portion includes a flat surface perpendicular to the principal plane of the surface of the absorption member.

5. The liquid discharge head according to claim 1, wherein the inclined surface of the second flow path portion is constituted by a flat surface or a curved surface.

6. The liquid discharge head according to claim 1, wherein the inclined surface of the second flow path portion is constituted by two flat surfaces.

7. The liquid discharge head according to claim 1, wherein the second flow path portion is integrally formed with the transparent member.

8. The liquid discharge head according to claim 1, wherein the first flow path portion is integrally formed with the absorption member.

9. The liquid discharge head according to claim 1, wherein an opening through which the flow path communicates with the liquid discharge substrate is formed in the transparent member, and wherein a region of the first flow path portion irradiated with a laser beam that has passed through the opening includes an inclined surface inclined with respect to the principal plane of the surface of the absorption member.

10. The liquid discharge head according to claim 9, wherein the inclined surface of the first flow path portion is constituted by a flat surface or a curved surface.

11. The liquid discharge head according to claim 1, wherein the flow path is disposed between the liquid discharge substrate and an ink tank for containing liquid supplied to the liquid discharge substrate, and
wherein the liquid discharge substrate communicates with the ink tank through the flow path.

12. The liquid discharge head according to claim 11, wherein the liquid discharge head includes a tank holder for holding the ink tank, and a portion of the tank holder constitutes the absorption member.

13. A method for manufacturing a liquid discharge head, the liquid discharge head including a liquid discharge substrate and a flow path, the liquid discharge substrate including a discharge port for discharging liquid, and the flow path supplying liquid to the liquid discharge substrate, the method comprising the steps of:
preparing an absorption member being capable of absorbing a laser beam, wherein a first flow path portion constituting a portion of a wall of the flow path is formed on a surface of the absorption member;
preparing a transparent member being transparent to a laser beam, wherein a second flow path portion constituting another portion of the wall of the flow path is formed on a surface of the transparent member; and
forming the flow path by welding the surface of the absorption member and the surface of the transparent member with each other at a periphery of the first flow path portion using a laser beam emitted through the transparent member toward the first flow path portion and the periphery of the first flow path portion, wherein the second flow path portion is constituted by a depression in a principal plane of the surface of the transparent member, and the depression includes an inclined surface inclined with respect to the principal plane of the surface of the transparent member in such a manner that the inclined surface is capable of reflecting a laser beam directed toward the first flow path portion.

* * * * *